(12) United States Patent
Miskell

(10) Patent No.: US 8,425,707 B2
(45) Date of Patent: Apr. 23, 2013

(54) PROCESS FOR FABRICATING SILICONE COATED ROLLERS WITHOUT BUILD LINES

(75) Inventor: Alan H. Miskell, Rittman, OH (US)

(73) Assignee: Wacker Chemical Corporation, Adrian, MI (US)

( * ) Notice: Subject to any disclaimer, the term of this patent is extended or adjusted under 35 U.S.C. 154(b) by 101 days.

(21) Appl. No.: 12/786,458

(22) Filed: May 25, 2010

(65) Prior Publication Data

US 2011/0290410 A1    Dec. 1, 2011

(51) Int. Cl.
*B65H 81/00* (2006.01)
(52) U.S. Cl.
USPC ........... 156/187; 156/184; 156/185; 156/191; 156/195; 156/244.11; 264/635
(58) Field of Classification Search .................. 156/184, 156/185, 187, 188, 191, 194, 195, 244.11; 264/635; 425/392, 393
See application file for complete search history.

(56) References Cited

U.S. PATENT DOCUMENTS

| | | | |
|---|---|---|---|
| 4,796,046 A * | 1/1989 | Suzuki et al. | 399/331 |
| 4,956,211 A | 9/1990 | Saito | |
| 5,260,364 A | 11/1993 | Johnson | |
| 6,007,657 A * | 12/1999 | Eddy et al. | 156/184 |
| 6,294,635 B1 | 9/2001 | Achenbach et al. | |
| 6,319,181 B1 * | 11/2001 | Naoi et al. | 492/56 |
| 6,362,299 B1 | 3/2002 | Wolfer | |
| 7,592,400 B2 | 9/2009 | Woerner | |

FOREIGN PATENT DOCUMENTS

| | | |
|---|---|---|
| FR | 992266 A | 10/1951 |
| GB | 986 734 A | 3/1965 |
| JP | 8006417 A | 1/1996 |
| JP | 9011362 A | 1/1997 |
| JP | 10039666 A | 2/1998 |

OTHER PUBLICATIONS

Wypych, George. Handbook of Fillers (2nd Edition). pp. 62-71. © 2000 ChemTec Publishing.*
Wypych, George. Handbook of Fillers (2nd Edition). pp. 131-137 and 172-174. © 2000 ChemTec Publishing.*

* cited by examiner

*Primary Examiner* — Khanh P Nguyen
*Assistant Examiner* — Carson Gross
(74) *Attorney, Agent, or Firm* — Brooks Kushman P.C.

(57) ABSTRACT

Rollers faced with silicone and having no build lines are produced by wrapping pigment/filler-containing addition-curable silicone rubber strips around a roller substrate followed by curing to an integral silicone layer, wherein build lines are prevented by selecting the strips such that physical properties at the edge regions of the strip due to orientation of pigment/filler particles is minimized.

1 Claim, 1 Drawing Sheet

PROCESS FOR FABRICATING SILICONE COATED ROLLERS WITHOUT BUILD LINES

BACKGROUND OF THE INVENTION

1. Field of the Invention

The present invention is directed to a process for the preparation of built-up non-cast silicone rollers which do not exhibit build lines.

2. Description of the Related Art

Polymer faced rollers have long been used in industry. The polymer facings reduce noise, confer chemical resistance, and cushion the contact of the roller against surfaces which it contacts. Many polymers have been used for such "faced rollers," including in particular, polyurethanes.

Silicones are a special class of polymers which have been used to make faced rollers. Silicones are available in a wide range of hardnesses, ranging from very soft elastomers to rigid materials. Moreover, silicones have physical and chemical characteristics which make them particularly well suited for certain roller applications. For example, silicones are very chemically resistant, and are highly resistant to thermal stress as well, providing a higher operating temperature than many commonly used polymer facings, such as those of polyurethanes. Moreover, silicones tend to have high releasability, and have been used in thin layer form (coatings) for many years as release coatings for pressure sensitive adhesives. Thus, silicones have found a valuable place in the faced-roller market.

While small diameter rollers may be faced with silicones by conventional thermoplastic or thermosetting techniques such as casting and injection molding, large diameter rollers or long rollers and like products cannot be made by such processes. Rather, such rollers are prepared in composite structures, for example by spiral wrapping of curable silicone rubber around the periphery of the roller, or by wrapping the entire periphery of the roller with succeeding layers of thin, curable silicone rubber. These techniques are shown in FIGS. 1 and 2, where FIG. 1 illustrates spiral wrapping of an extruded strip of silicone rubber 2 around metal core or "boss" 1, and wherein FIG. 2 illustrates concentric wrapping. Other wrapping methods are also possible.

The roller boss (1) is generally of metal, although it may be made of other materials as well, for example thermoplastic or thermosetting polymers, wood, ceramic, etc. For reasons of cost, durability, and physical properties such as modulus and freedom from distortion, metals such as aluminum or steel are commonly used.

The boss or other substrate is generally treated to facilitate adherence of the silicone to the boss. For example, the surfaces of the metal boss may be knurled or otherwise machined, may be grooved, sometimes with grooves which are narrower at the surface of the roller than further toward the axis or center of the roller ("undercuts"), or may be treated by blasting, e.g. sand blasting. Since the boss surfaces can be obscured or substantially obscured after application of an opaque or semi-opaque silicone, care in preparing an aesthetic surface on the boss can be dispensed with. This is the customary procedure; filled and pigmented silicone rubbers are used to face the roller, thus obscuring the rough surface. The pigments may also be used to provide an aesthetic or distinguishing color. Avoiding fine machining or finishing of the boss allows for economy of manufacture without loss of adhesion, for which the surface treatment is used. Following facing of the boss with the curable silicone rubber, the composite is heated or otherwise treated to cure the silicone rubber. This may be achieved by numerous methods well known in the art. For example, the surface may be placed under modest pressure by a suitable mold or pressure bladder and cured at elevated temperature. Following cure, the now integral silicone facing is machined to present a surface which is rotationally uniform and of the desired smoothness. Frequently, the uncured, built-up roller is tightly wrapped with a polymer fabric, and then heated or "autoclaved." The increase in diameter due to thermal expansion is sufficient to place the silicone layer(s) under pressure against the fabric, facilitating consolidation. The silicone rubber merges or coalesces where adjacent strips or layers abut, creating an integral silicone facing.

The silicones used in such applications are generally pigmented and/or filled. The pigmentation may be used to produce a recognizable color and to obscure the boss surface, while fillers act both to lower the cost of the facing by replacement of relatively expensive silicone with inexpensive filler, and also to increase wearability of the facing. It has been found, however, that silicone roller facings containing pigments and fillers exhibit so-called "build lines" at what were the edges of the silicone rubber prior to curing/consolidation. These build lines are often observable visually as a difference in height or color near what were the edges of the uncured silicone facing. Even after machining, latent build lines exist which manifest themselves particularly when the rollers are used in an environment where solvents are employed. The silicone tends to swell under such conditions, but the swelling is not uniform across the surface. Rather, the swelling at the build line positions 3 (FIGS. 1, 2) is different from swelling at the remaining portions 4 of the roller. Thus these portions of the roller will exert different pressure on substrates moved under the roller at the build line positions. This difference in pressure may be then manifested in a product produced by use of such rollers as elevations or depressions in the product surface.

It would be desirable to produce a silicone faced roller by wrapping techniques which do not exhibit build lines.

SUMMARY OF THE INVENTION

Applicant has surprisingly and unexpectedly discovered that build lines may be prevented in wrapped, silicone-faced rollers, by selecting pigments and fillers such that the particle size and anisotropy of the pigments and fillers are low, and do not result in significant particle orientation at the edges of extruded silicone rubber "ribbons" or sheets. The use of non-differentially oriented, pigment/filler-containing silicone rubber thus prevents build lines.

DETAILED DESCRIPTION OF THE PREFERRED EMBODIMENTS

Figure 1:
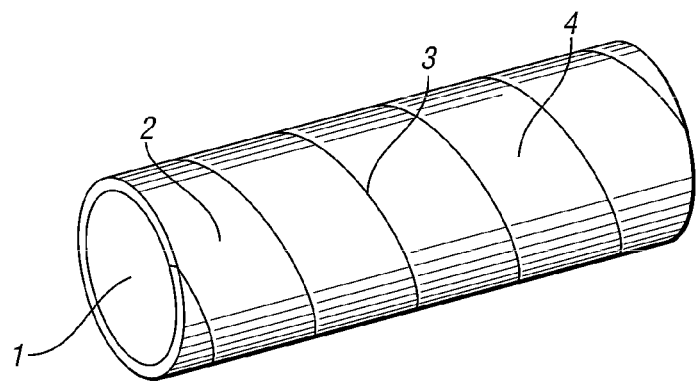
FIG. 1 illustrates spiral wrapping of a substrate with strips of silicone rubber.
Figure 2:
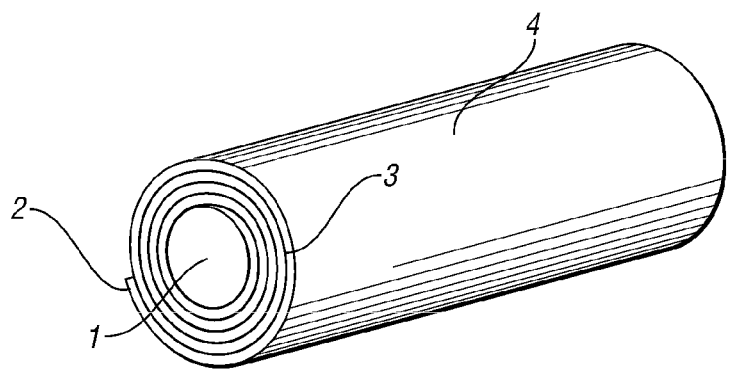
FIG. 2 illustrates concentric wrapping of a substrate with a wide ribbon or "sheet" of silicone rubber.

The silicone rubbers used in the present invention are characterized by a very high viscosity such that they are solid or semi-solid prior to cure. By "solid or semi-solid" means that a silicone rubber extruded ribbon or sheet (hereinafter, "strip") will substantially maintain its extruded shape under normal handling at room temperature and ambient temperatures close to room temperature. At elevated temperatures, e.g. above 50° C. or so, softening of the rubber may occur, and this softening, creating deformability, is necessary, particularly near or at the curing temperature, to allow the silicone to flow and merge with adjacent strips to provide a unitary, integral product. The invention is not directed to silicones of flowable viscosity at room temperature, i.e. the so-called Liquid Silicone Rubber, "LSR."

The silicone rubbers are addition crosslinked silicone rubbers. For the most part, these silicone rubbers are one part silicone rubber composed of silicones (organopolysiloxanes) bearing ethylenically or ethylynically unsaturated groups, preferably the former, together with a crosslinking system. The crosslinking system may be a free radical initiator, preferably a peroxide, or may be an Si—H functional crosslinker and hydrosilylation catalyst. When hydrosilylation-curable single component silicone rubbers are used, it is generally necessary that either a latent catalyst which is only appreciably active at the elevated curing temperature is employed, or that a catalyst inhibitor be used. Often, a combination of latent catalyst and inhibitor are both used. Addition curing silicone rubbers of both types (HTV rubber) are well known to those skilled in the art. Condensation crosslinkable silicone rubbers are not within the scope of the invention, although the addition curable rubbers may contain a portion of condensable groups such as silanol groups or alkoxy groups, which can cure during cure of the unsaturated groups, but which will predominantly cure following initial fabrication and consolidation of the roller.

By "roller" in the context used herein are meant rollers such as those used in conveying systems, paper manufacturing, and the like, as well as larger rollers or "drums" which may find use as nip rolls, for example. The "rollers" contain a metal boss or "substrate" around which the silicone rubber is wrapped, and the size or end-use of the "roller" is not limiting. While the term "roller" as used herein applies to such structures, they may also be termed "wrapped composite structures."

The "wrappings" of the present invention are prepared by extruding the curable silicone composition into a strip. The strip may have any suitable width, e.g. 10 cm to 40 cm, or any width which facilitates wrapping around the substrate. The thickness may be small, i.e. 1 mm or less, but is typically larger, depending upon the thickness desired and the type of wrapping which is used to construct the roller. Thicknesses of several mm to several cm are typical. The term "sheet" herein is meant to simply categorize strips with a relatively large width in relation to thickness, and the dimensions are not critical. In the remainder of the disclosure, and in the claims, the term "strip" will be used for both.

The cause of build lines is not completely clear, and without wishing to be bound thereby, applicant believes that the build lines are caused by an orientation of large and "asymmetric" pigments and fillers near the edges of the extruded silicon strip. It is known in the extrusion of thermoplastics, for example, that extrudate near the center of a slit die is exposed to less stress than near the edges of the die, and it is believed that the increased friction caused at the corners of the slit die tends to orient particles in a manner different from other portions of the extrudate. As a result, the properties of the extrudate at its edges are physically different from that away from the edges. For example, the inventor has unexpectedly discovered that strips prepared by slitting a wider width material prepared using a mill such as a two roll mill fail to exhibit build lines when used to produce faced rollers.

Thus, the inventor has discovered that build lines of faced rollers can be eliminated by selecting the filled/pigmented silicone rubber, in particular the filler and pigment contained in the silicone rubber, such that orientation near the edge of the strip does not occur. This can be accomplished, for example, by selecting fillers and pigments of very small particle size, selecting fillers and pigments which have a low aspect ratio, preferably substantially spherical, or by both these methods. Alternatively, in a less preferred aspect of the invention, the edges of an extruded strip of silicone can be trimmed to remove the portion which has experienced orientation, or may be produced by a method which does not cause edge orientation. In either case, a wide variety of fillers and pigments can be used, but the former process is wasteful of relatively expensive curable silicone, and the latter process is more technologically complex.

The pigments and fillers preferably are not plate-like and are substantially spherical, or otherwise compact, e.g. cubical, and have an aspect ratio of 2.0 or less, preferably 1.5 or less, and most preferably about 1.0. This relatively spherical nature of the pigments and fillers applies specifically to large diameter fillers and pigments, i.e. those having mean particle sizes (longest dimension) of about 70 µm or above. Examples of fillers and pigments for which build lines can be expected include platelike materials such as ground micas, expanded or non-expanded, and layered clay materials, and ground mineral fillers with appreciable non-sphericity such as ground quartz and limestone, and fibrous fillers of any appreciable length.

It is preferable that the maximum particle size of fillers and pigments be less than 70 µm, more preferably less than 60 µm, yet more preferably less than 60 µm, and most preferably less than 50 µm. Particle sizes of about 44 µm or less have proven to be particularly useful. In the case of exceptionally small fillers, i.e. those below 50 µm, some increased tolerance with regard to their morphology can be tolerated.

By the term "pigment/filler-containing" or like terms is meant that the uncured silicone rubber contains at least one pigment or filler, or both. It is at times difficult to distinguish between what is a pigment and what is a filler, and, to this extent, these terms may be considered to be interchangeable unless indicated to the contrary. However, fillers are generally considered as larger particle size additives which do not appreciably increase the strength properties of the rubber. One exception are the so-called "reinforcing fillers" which have a specific surface area, generally between 50 $m^2/g$ to 400 $m^2/g$, which can increase physical properties. These latter fillers generally also substantially increase the viscosity of the silicone rubber, whereas conventional, larger particle size fillers show little increase in viscosity. Such larger particle size fillers are often added to lessen the cost of the rubber on a weight or volume basis, to confer slip properties, or to increase abrasion resistance.

Pigments are generally understood to be very small size and highly colored particles, which also includes white and black as "colors," which are used in relatively small quantities. Such pigments are generally added to provide color or opacity rather than an increase in physical properties or abrasion resistance, etc. Yet, there is some overlap of particle sizes and morphologies of pigments and fillers.

Examples of fillers include a variety of ground or crushed natural products such as limestone, dolomite, marble, rutile, quartz, and feldspar, and precipitated fillers such as precipitated calcium carbonate, precipitated silica (colloidal silica), and the like. This list is non-limiting. In the present invention, fillers with a pronounced aspect ratio should be avoided, particularly in larger size fillers.

Examples of pigments include pigments such as carbon blacks, fumed titania, fumed iron oxide, and the like, and organic pigments of various classes. It is noted that there is a distinction between organic dyes and pigments, the former being soluble, while the latter are not.

By "morphology" is meant the shape of the particles, whether they be pigments or fillers. It is preferable that the particles used herein be substantially spherical in order that orientation during extruding is not dependent upon process stress. The aspect ratio is generally preferred to be less than 1.5. Spherical fillers have an aspect ratio of 1.0, whereas cubic fillers have an aspect ratio of 1.4 (ratio of greatest width to least width).

It has been found, for example, that standard iron oxide pigments, which are available in colors ranging from black to brown to red to yellow, can cause build lines at as low a concentration of 1.5 weight percent. However, fumed pigments such as fumed silica, fumed iron oxide, and fumed titania, do not cause build lines even at concentrations as high as 10% by weight, and it is reasonably expected that even higher concentrations will not show build lines as well.

Determination of whether the pigments and fillers are suitable for the method of the invention is easily accomplished without undue experimentation by one skilled in the art. The particular particle size and particle morphology which are suitable may vary somewhat with the nature of the curable silicone base composition, for example its viscosity and thixotropy, in the case of thixotropic compositions, and may also vary with the geometry of the particular extrusion die as well as the extrusion temperature, pressure, and rate of extrusion, etc. Thus, it is preferable to quickly test the suitability of the fillers and pigments by preparing a filled and/or pigmented curable silicone by conventional mixing methods such as by use of sigma blade mixers, Banbury mixers, dough mixers, single and twin screw extruders, kneading cascades, reciprocating kneaders, and the like, extruding a strip of the desired thickness and width, and adjoining these in the same fashion as they would be used in fabricating the proposed faced roller. The layers are cured at elevated temperature under a pressure sufficient to cause consolidation at the abutting surfaces. The determination may be made on a full size substrate just as easily, albeit at higher cost, and at times this may be preferable, as it is sometimes difficult to duplicate the curing parameters in the laboratory.

Upon cure and after cooling, the presence of build lines may be assessed by numerous methods. The first of these is tactile/visual observation. This method is most appropriate after initial cure, and before machining of the roller surface. A second method, which may be used in the same manner, is profilometry. Profilometers are widely available, and are more sensitive than tactile examination.

Following machining to produce a smooth and uniform surface, tactile sensing and profilometry are in general not useful, except as indicated below. However, reflectance measurements can be made across the roller. Preferably the reflectance is measured at a wavelength which allows for some penetration of the roller surface. Pigment/filler orientation will be observable as a change in reflectance near the build line. Sometimes this change is visually observable as well, either before or after machining, and indicates the presence of a build line.

One very suitable means of detecting build lines, particularly after machining, is the use of solvent swelling. Many common solvents are absorbed by silicone rubbers, and many solvents such as alcohols, ketones, and aromatic or paraffinic hydrocarbons are used in processes where the rollers will be used. Since the rubbers are crosslinked, they do not dissolve, but reversibly swell in the presence of the solvent. When swollen, even after machining, the build lines are generally detectable by feel, i.e. by lightly tracing a finger across the surface of the roller. The area at the build line will swell an appreciably different amount as compared to other portions of the roller, and profilometry is generally not needed to detect the build lines, but may be used to quantify them. Solvent swollen build lines are shown as 5 in FIG. 3, and at the edge of the concentrically wrapped roller in FIG. 4, the height and thickness of the build lines being exaggerated for purposes of clarity.

If build lines are observable by one of the above methods, the pigment and/or filler is required to be changed, e.g. to a smaller mean particle size, to a filler/pigment with lower aspect ratio, i.e. more nearly spherical, or both. It has been surprisingly and unexpectedly found that build lines are in general undetectable when small pigments and fillers of near spherical morphology are used. One rule of thumb which has proven useful is the use of pigments/fillers which are small enough to be transparent, i.e. do not result in a completely opaque cured silicone product. By suitable choice and amount, the rollers may still be afforded a degree of coloration which obscures the substrate, or "boss," in the case of a roller per se. Colloidal silica is especially suitable as a filler, as this precipitated silica has relatively uniform spherical morphology. The same is true of other precipitated fillers which assume a spherical as opposed to a needle-like morphology. Fumed pigments have been proven to be exceptionally useful.

In an alternative embodiment of the invention, the extruded, uncured silicone strip may be trimmed at the edges to remove a portion of the strip wherein the pigments/fillers have become oriented. After wrapping and curing, the presence or absence of build lines may be assessed by the methods described above. In this case, the particle size and morphology is not overly important, as the trimming process removes all or substantially all of the strip wherein the pigment/filler orientation is substantially different from the remainder. Unfortunately, this embodiment involves waste or reworking of the trimmed portions, so is less economical.

A third alternative embodiment of the present invention is to avoid orientation of pigments and fillers by preparing the pigmented/filled curable silicone elastomer on a mill, and slitting the sheet thus produced into strips. By this technique, the orientation which occurs near the edges of an extrusion die is eliminated. The strips thus produced are wrapped and cured in conventional fashion.

Figure 3:
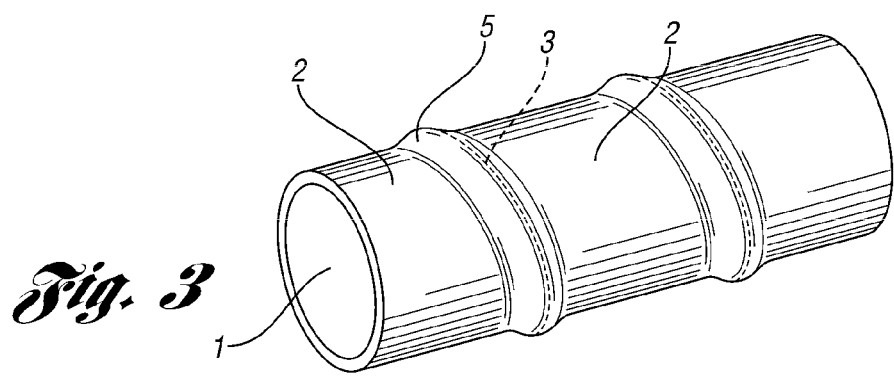
FIG. 3 illustrates solvent swollen build lines on a spiral wrapped composite roller.

FIG. 3 illustrates a solvent-swollen build line, wherein 1 represents the substrate around which the curable silicon strip was spirally wrapped, dashed line 3 represents where the wrapped strips abutted prior to consolidation and curing, and 5 represents a swollen section proximate the original abutment 3 of the silicone rubber.

Figure 4:
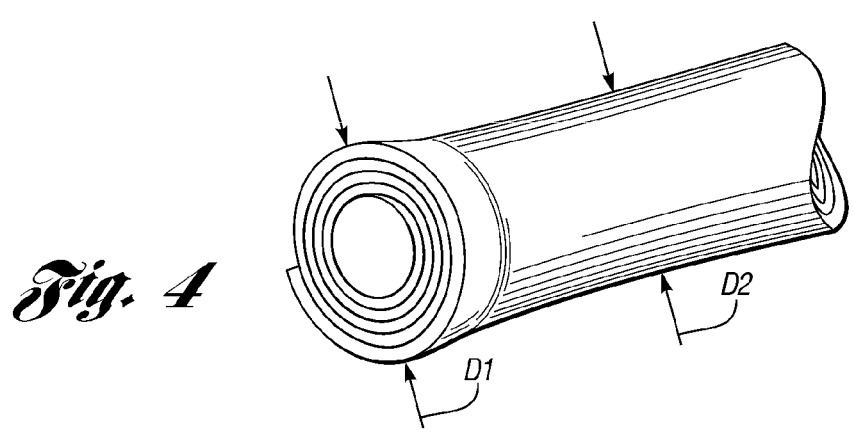
FIG. 4 illustrates end "build lines" or "swelling" in a concentrically wrapped silicone faced roller.

FIG. 4 illustrates a solvent-swollen build line which is observable with concentric wrapping. In this case, the build lines constitute the edges of the roller. Only one edge is shown. Even though solvent may uniformly be absorbed over the roller, the edges, which represent the edges of the sheet used to wrap the roller, are swollen to a different degree than the remainder of the wrapping, and thus the solvent-swollen diameter D1 is generally higher than the diameter D2 which is further from the edge.

The addition cured silicone rubbers of the present invention, other than the pigment and fillers, are conventional. Preferred silicone rubbers in the uncured state have a Mooney viscosity of 15 to 100, more preferably 25 to 90, and most preferably 40 to 80. Such curable silicone rubbers are available commercially, for example as ELASTOSIL® R401/30 through R401/80 peroxide-curable silicone rubbers and ELASTOSIL® R plus 4001/30 through R plus 4001/80 platinum-catalyzed addition cure silicone rubbers available from Wacker Chemical Corporation, Adrian, Mich. Further examples of such curable silicone rubbers may be found in the patent literature, for example in U.S. Pat. Nos. 5,260,364, 6,294,635, 6,362,299, and 7,592,400, and are described, e.g. in Walter Noll, CHEMISTRY AND TECHNOLOGY OF SILICONES, Academic Press, © 1968. Such HTV rubbers are available from other commercial sources as well.

The pigment/filler can be added to the base silicone rubber in dry form, as a concentrated master batch in the same silicone rubber base or a component thereof, dispersed in silicone fluid, or by any conventional method, in a mixing apparatus such as those previously identified, on a two or three roll mill, etc. The amount of pigment/filler may range from 0.5 to 60 weight percent, more preferably 1 to 50 weight percent, yet more preferably 2 to 45 weight percent, and most preferably 2 to 30 weight percent, based on the total weight of the pigmented/filled silicone rubber.

The pigments and fillers may be hydrophilic, or may have been hydrophobicized or treated to render them less hydrophilic, i.e. by treatment with silanes, organopolysiloxanes, fatty acids, fatty acid salts such as zinc stearate, or wax. Such hydrophobicized pigments and fillers are commercially available from numerous sources, or can be prepared by conventional techniques well known to those skilled in the art.

The silicone rubber strips are wrapped around the substrate in conventional fashion, and cured under pressure at elevated temperature. The pressure may be supplied by an air bladder, multi-part closeable mold, thermal expansion in an autoclave or oven, or any similar technique which allows the rubber to consolidate where the wrapped rubber abuts another portion of uncured rubber. Curing is generally effected at temperatures of from 100° C. to 200° C., more preferably 120° C. to 180° C., and most preferably from 150° C. to 170° C.

EXAMPLES

Comparative Example 1

A curable silicone rubber base, ELASTOSIL® R401/80, available from Wacker Chemicals, Adrian, Mich., is compounded with 1.5% by weight of conventional red iron oxide pigment masterbatch, SILCOGUM® Red 042, available from Gayson SDI. The uncured rubber is extruded as a continuous strip measuring 1" wide by 0.250" in thickness, and is spirally wrapped around a roller substrate, wrapped with nylon textile, heated to 150° C. and cured for 8 hours. The cured faced roller is ground smooth and solvent is applied. Build lines are evident by touch as raised portions on the roller proximate the areas of contact of the uncured, spirally wrapped strip. The roller facing had a hardness of 80 Shore A.

Comparative Example 2

Comparative Example 1 is repeated, but with 9 weight percent conventional iron oxide pigment. Build lines are again evident.

Example 3

Comparative Example 1 is followed, but the conventional iron oxide pigment is replaced with fumed silica, HDK N20P, available from Wacker Silicones, having a mean particle size of approximately 0.5 µm. No build lines are detected.

Example 4

Comparative Example 1 is followed, but instead of 1.5 weight percent conventional iron oxide, approximately 2 weight percent of fumed silica, HDK-N 20 P, and 0.040 weight percent of SILCOGUM® 243A Blue, a phthalocyanine blue pigment dispersion available from Gayson SDI, is used. No build lines are detected.

Example 5

Example 4 is repeated, but with the substitution of fumed titanium dioxide, K-73995 P25 Masterbatch, available from Dispersion Technology, Inc., in an amount of about 0.1 weight percent is substituted for the phthalocyanine blue pigment. A milky white curable elastomer results. No build lines are detectable.

Example 6

Example 5 is repeated, but the fumed titanium dioxide is replaced by red fumed iron oxide, a component of base KE 7021 U, available from Shinetsu Silicones. A pale reddish elastomer is produced. No build lines are detectable.

Reference Example 7

A natural colored 70 Shore A elastomer containing phenylmethylsiloxy groups, and containing no filler, is employed. The faced roller exhibited no build lines.

Example 8

Reference Example 7 is repeated, but 1 weight percent of fumed titanium dioxide is added as a pigment/filler to produce a more heat resistant elastomer which is off-white in color. No build lines are detectable.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A method for producing a pigment/filler-containing silicone faced roller with no build lines, comprising:
  providing a strip of extruded, pigment/filler-containing addition-curable silicone rubber, wherein at least one filler or pigment has a size and/or morphology which causes pigment/filler orientation which is different from other portions of the strip proximate the edge of the extruded strip as the strip exits an extruder used to extrude the strip,
  removing edge regions having said pigment/filler orientation which is different from other portions of the strip to form an edge portion-removed strip,
  wrapping said edge-portion removed strip of extruded, pigment/filler-containing addition-curable silicone rubber onto a roller substrate, the wrapping being such that adjacent portions of the edge-removed strip are in abutting contact, and curing the addition-curable silicon rubber to produce an integral cured silicone rubber layer having no build lines on the substrate, and subsequently machining an exposed silicone surface of the faced silicone roller.

* * * * *